US012442235B2

(12) United States Patent
Persson et al.

(10) Patent No.: US 12,442,235 B2
(45) Date of Patent: Oct. 14, 2025

(54) REVOLVING DOOR

(71) Applicant: Assa Abloy Entrance Systems AB, Landskrona (SE)

(72) Inventors: Magnus Persson, Helsingborg (SE); Mikael Buschow, Malmo (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 42 days.

(21) Appl. No.: 17/908,605

(22) PCT Filed: Mar. 18, 2021

(86) PCT No.: PCT/EP2021/056908
§ 371 (c)(1),
(2) Date: Sep. 1, 2022

(87) PCT Pub. No.: WO2021/185946
PCT Pub. Date: Sep. 23, 2021

(65) Prior Publication Data

US 2023/0160246 A1 May 25, 2023

(30) Foreign Application Priority Data

Mar. 19, 2020 (SE) .................................... 2030092-7

(51) Int. Cl.
*E05D 15/02* (2006.01)
*E05F 15/608* (2015.01)

(52) U.S. Cl.
CPC ............ *E05D 15/02* (2013.01); *E05F 15/608* (2015.01); *E05Y 2400/612* (2013.01); *E05Y 2400/628* (2013.01); *E05Y 2800/692* (2013.01)

(58) Field of Classification Search
CPC ............... E05D 15/02; E05Y 2400/612; E05Y 2400/628; E05Y 2400/60; E05Y 2400/61;
(Continued)

(56) References Cited

U.S. PATENT DOCUMENTS

| | | | | |
|---|---|---|---|---|
| 3,697,972 A * | 10/1972 | Brown | G01V 3/105 | 43/60 |
| 4,159,171 A * | 6/1979 | Nineberg | G03D 17/00 | 396/589 |

(Continued)

FOREIGN PATENT DOCUMENTS

| | | |
|---|---|---|
| CN | 2525216 | 12/2002 |
| CN | 204494971 U * | 7/2015 |

(Continued)

OTHER PUBLICATIONS

Easy Secure Portable Turnstile, retireved from the Internet on Sep. 14, 2020 from https ://www, gera n-access.com/wpcontenUu p loads/20 1 8/08/FS-easy-port. -tu rnsti le-zonder-logo-C.pdf. Jul. 7, 2017.

(Continued)

*Primary Examiner* — David E Sosnowski
(74) *Attorney, Agent, or Firm* — Wissing Miller LLP

(57) ABSTRACT

A revolving door (100) is provided. The revolving door (100) comprises a base portion (110), an upper portion (120), and a rotating assembly (130) extending between the base portion (110) and the upper portion (120), and at least one door panel (140) connected to the rotating assembly (130) and being rotatably arranged around a central axis (A1). The revolving door (100) further comprises one or more lifting means (111*a-b*, 121).

13 Claims, 12 Drawing Sheets

(58) Field of Classification Search
CPC ........... E05Y 2800/692; E05Y 2900/40; E05Y 2900/60
USPC ............................................................... 49/42
See application file for complete search history.

(56) References Cited

U.S. PATENT DOCUMENTS

| | | | | | |
|---|---|---|---|---|---|
| 4,586,441 | A * | 5/1986 | Zekich | E05G 5/02 | 109/6 |
| 6,550,623 | B2 * | 4/2003 | Cook | B65D 88/129 | 211/13.1 |
| 6,725,603 | B1 * | 4/2004 | Pansini | E05D 15/48 | 49/141 |
| 7,823,338 | B2 * | 11/2010 | Slagel | E04H 1/1205 | 52/33 |
| 8,015,754 | B2 * | 9/2011 | Slagel | E04H 3/08 | 52/79.8 |
| 8,308,408 | B2 * | 11/2012 | Gaudette | B60P 7/15 | 410/43 |
| 9,123,224 | B2 * | 9/2015 | Hall | G08B 13/248 | |
| 11,254,494 | B2 * | 2/2022 | Ford, III | B65D 90/0053 | |
| 2006/0107614 | A1 * | 5/2006 | Slagel | E04H 3/08 | 52/750 |
| 2008/0250726 | A1 * | 10/2008 | Slagel | E04H 1/1205 | 52/79.8 |
| 2010/0095594 | A1 * | 4/2010 | Prasad | E05G 5/003 | 49/70 |
| 2014/0197717 | A1 | 7/2014 | Busch | | |
| 2014/0259930 | A1 * | 9/2014 | Gilliam | E05F 15/635 | 49/70 |
| 2023/0160246 | A1 * | 5/2023 | Persson | E05D 15/02 | 49/42 |

FOREIGN PATENT DOCUMENTS

| | | | |
|---|---|---|---|
| CN | 107420024 | | 12/2017 |
| CN | 212341668 | U * | 1/2021 |
| DE | 202008004693 | | 6/2008 |
| EP | 2137356 | | 12/2009 |
| JP | 2000008722 | A * | 1/2000 |

OTHER PUBLICATIONS

Portable Tandem Turnstile W Canopy https://turnsti les. myshopify. com/prod ucts/portabletandemturnstile-w-canopy. Dec. 14, 2019.
International Search Report and Written Opinion in PCT/EP2021/056908 mailed Jun. 29, 2021.
Swedish Search Report in 2030092-7 mailed Sep. 23, 2020.

* cited by examiner

REVOLVING DOOR

This application is a 371 of PCT/EP2021/056908, filed on Mar. 18, 2021, published on Sep. 23, 2021 under publication number WO 2021/185946, which claims priority benefits from Swedish Patent Application No. 2030092-7, filed on Mar. 19, 2020, the disclosure of which is incorporated herein by reference.

TECHNICAL FIELD

The present invention relates to a door. In particular, the present invention relates to a revolving door configured to accommodate and preferably control access for people.

BACKGROUND

Doors, such as revolving doors, are available in various configurations and designed for different applications; e.g. a revolving door may be constructed depending on the number of people that are expected to walk through the revolving door and the particular dimensions to visually fit with an associated building. For fixed installations, a revolving door is typically manufactured based on the desired size in a customized fashion.

One type of a revolving door has a rotating assembly in the form of a central column and at least one door panel connected to the central column and being rotatably arranged around a central axis. Another type of a revolving door has no central column, but a rotating assembly arranged above the ceiling of the revolving door. The rotating assembly is capable of driving one or more center passage pivoted break out doors.

These different types of revolving doors can be automatically controlled to allow access control of the people passing through the door. Revolving doors of these types can therefore be power assisted, i.e. they are equipped with a drive unit, including a motor, and a control unit in communication with the drive unit and programmed to control operation of the revolving door. A battery may be provided in order to ensure that an opening operation of the door can be performed even during an unexpected shut down of external power. These batteries, however, are not capable of supplying enough power during normal long term operation of the revolving door.

Due to increased popularity for these kinds of revolving doors it has been suggested to provide more sophisticated solutions also for temporary events, such as outdoor festivals, sports events, etc. It is common that such events are arranged at remote locations, whereby it is required to transport all required equipment to the event site. At these sites, there is often limited access to expert staff which means that any installation, such as an access control door, should be provided as complete as possible, preferably in a ready-to-use configuration. This is however quite far from normal installation procedures, where the revolving door is assembled on-site. Even if the revolving door were to be transported to the event site in a fully assembled state, it will be very fragile and difficult to arrange in its final position. This is especially the case for events where the on-site staff has no experience of handling and installing large doors.

Thus, there exists a need for improved revolving doors, especially for temporary installations and events.

SUMMARY

It is an object of the invention to at least partly overcome one or more of the above-identified limitations of the prior art. In particular, it is an object to provide a revolving door which has improved capabilities for allowing facilitated installation.

According to a first aspect, a revolving door is provided. The revolving door comprises a base portion, an upper portion, and a rotating assembly, e.g. a central column, extending between the base portion and the upper portion. The revolving door further comprises at least one door panel connected to the rotating assembly and being rotatably arranged around a central axis, and one or more lifting means.

Said lifting means may be arranged at the base portion. In some embodiments, the lifting means form at least one groove configured to receive a lifting member.

The lifting means may comprise a first pair of two parallel grooves, each groove extending from one side of the base portion to the opposite side of the base portion. The lifting means may further comprise a second pair of two parallel grooves, each groove extending from one side of the base portion to the opposite side of the base portion, wherein the second pair of grooves are arranged perpendicular to the first pair of grooves.

In an embodiment, the lifting means are arranged at the upper portion.

The lifting means may comprise at least one eye bolt, preferably a plurality of eye bolts.

The plurality of eye bolts may be arranged at the periphery of the upper portion. Preferably, the plurality of eye bolts are equally spaced part.

In an embodiment, the lifting means extend vertically upwards from the upper portion.

The revolving door may further comprise a drive unit configured to control operation of the revolving door, and a stand-alone power system connected to the drive unit.

The stand-alone power system may comprise an electricity generation apparatus, an energy storing device, and a power regulation apparatus.

In an embodiment, the electricity generation apparatus comprises a wind turbine, one or more solar cells, and/or a diesel generator.

The revolving door may further comprise an upper portion being arranged vertically above the rotating assembly, wherein the stand-alone power system is arranged at said upper portion.

In an embodiment, the stand-alone power system comprises one or more wind turbines arranged onto the upper portion, and/or arranged in a cavity of said upper portion.

The stand-alone power system may comprise one or more solar cells arranged on a front façade of said upper portion.

The revolving door may further comprise a rotatable support onto which the stand-alone power system is mounted.

The stand-alone power system may be arranged remote from the rotating assembly, the at least one door panel, and the drive unit.

The stand-alone power system may be further configured to generate electricity from the rotation of the at least one door panel or the rotating assembly, and/or from braking of the at least one door panel and/or rotating assembly.

In an embodiment, the stand-alone power system is configured to generate electricity from induction during rotation of the at least one door panel.

The stand-alone power system is preferably dimensioned to supply at least a part of the total power required by the drive unit, and preferably the total power required by the drive unit.

BRIEF DESCRIPTION OF THE DRAWINGS

The present invention will hereinafter be further explained by means of non-limiting examples with reference to the appended schematic figures where.

DETAILED DESCRIPTION

Figure 1:
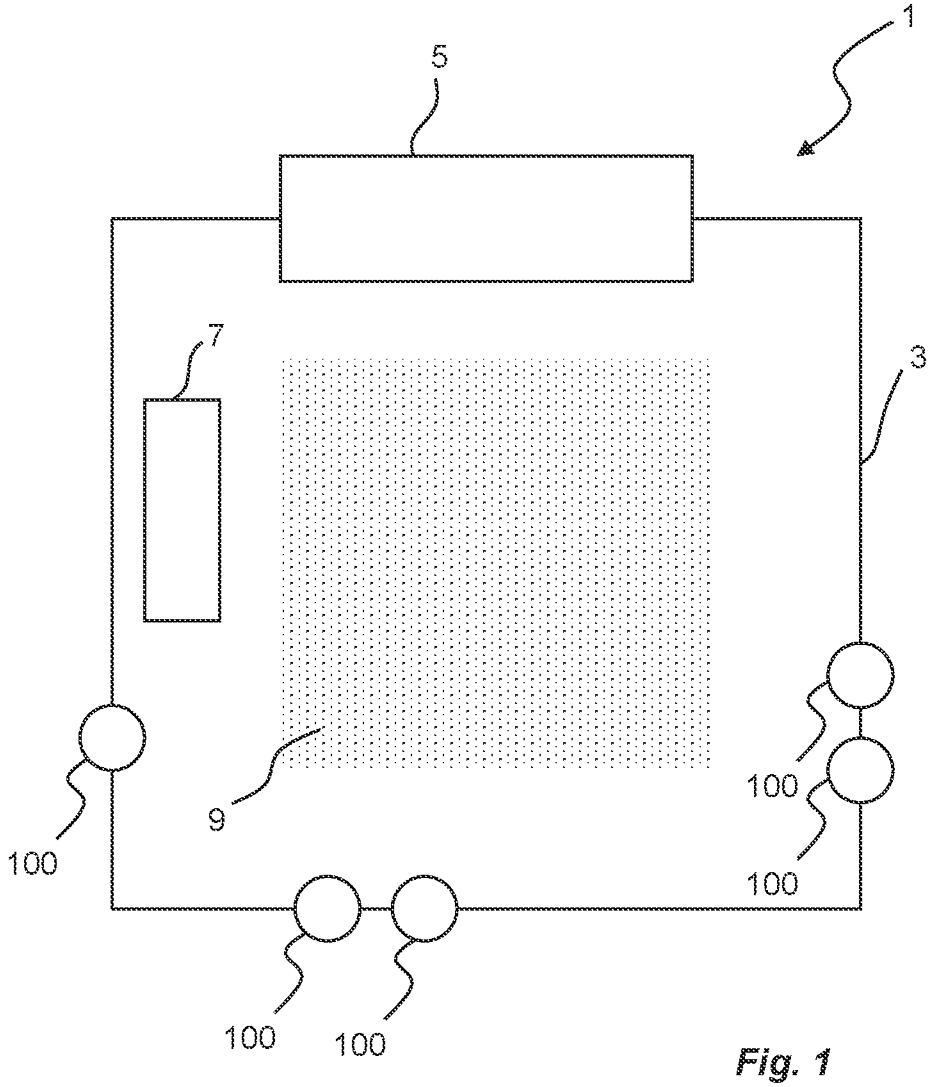
FIG. 1 is a schematic overview of an event site having a plurality of revolving doors according to an embodiment.

Starting in FIG. 1, an event site 1 is schematically shown from above. The event site 1 is representing a temporary arrangement for allowing people to enter the event site 1 and enjoying the activities therein. Typically, the event site 1 may be designed to host a sports event, a music festival, a food event, or any other suitable activity. The event site 1 may be arranged indoors or outdoors.

The event site 1 is preferably defined by some sort of outer boundary, such as a fence 3 or similar surrounding the area. As an example the event site 1 may be provided with a stage 5, a food serving 7, and an area 9 for people to watch the stage 5. The particular design of the event site could however be of any suitable configuration, depending on location, size, and type of event.

The event site 1 is further provided with one or more revolving doors 100 in order to allow people to enter and exit the event site 1 in a controlled manner. The revolving doors 100 are located in connection with the outer boundary of the event site 1, and/or inside the event site 1 to allow people to enter/exit sub-areas within the event site 1.

Figure 2A:
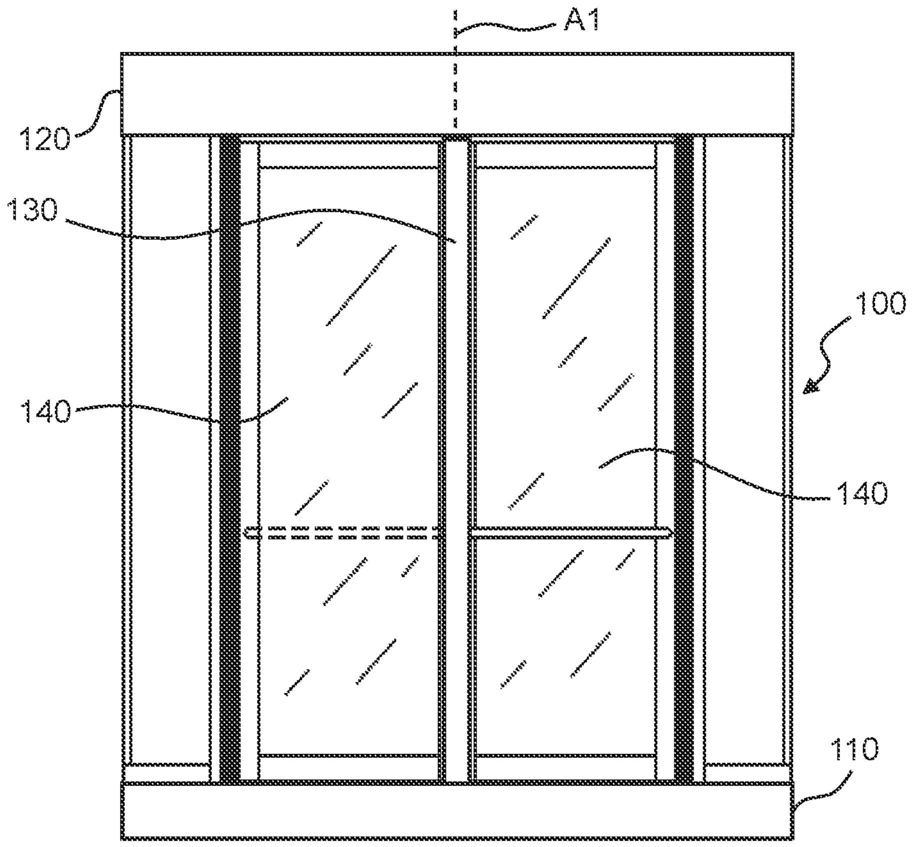
FIG. 2*a* is a front view of a revolving door according to an embodiment.
Figure 2B:
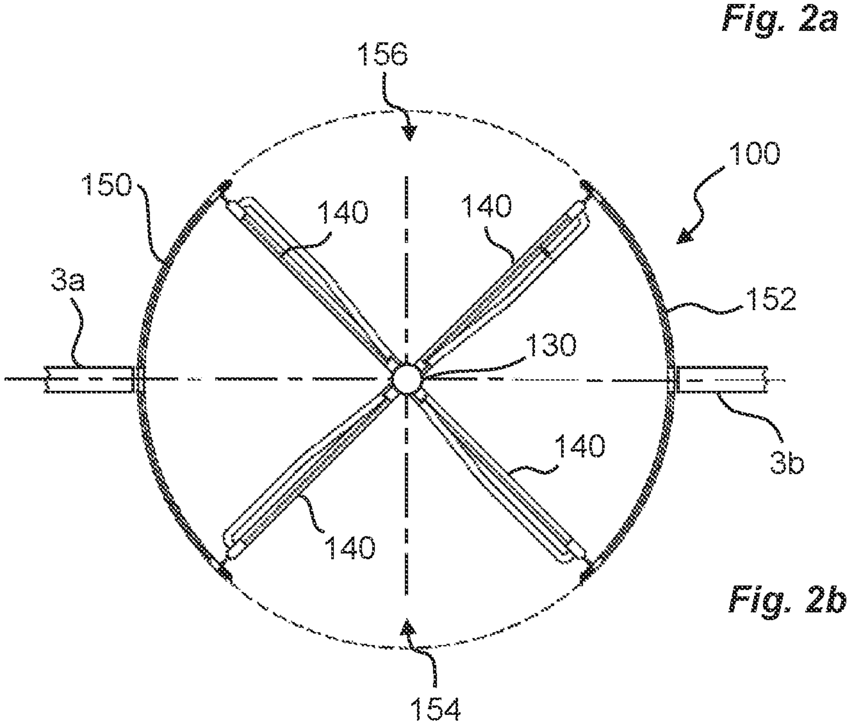
FIG. 2*b* is a cross-sectional view of the revolving door shown in FIG. 2*a;*

A revolving door 100, used to allow people to enter and/or exit the event site 1 of FIG. 1, is further shown in FIGS. 2*a-b*. It should however be noted that in the following, the described embodiments of a revolving door may not exclusively be adapted to the use with the event site 1 of FIG. 1 but the revolving doors 1 can be used with other kinds of temporary installations, such as tents or similar, or more long-term installations like regular buildings, parts of buildings, barracks, etc.

As shown in FIG. 2*a*, the revolving door 100 comprises a bottom base member 110, an upper top member 120, and a rotating assembly in the form of a central column 130 extending vertically between the base member 110 and the top member 120. At least one door panel 140, in the shown example there are four door panels 140, are connected to the central column 130 and rotatably arranged around a central axis A1.

As is further shown in FIG. 2*b*, the revolving door 100 has a first side wall portion 150 and a second side wall portion 152. Each first and second side wall portion 150, 152, extends vertically between the base member 110 and the top member 120 and forms a cylindrical (and circular) arc. The first side wall portion 150 is arranged in connection with a first enclosing structure 3*a*, and the second side wall portion 152 is arranged in connection with a second enclosing structure 3*b*. The first and second enclosing structures 3*a*, 3*b* may e.g. be posts forming part of the fence 3 in FIG. 1. The revolving door 100 is thereby closing the gap formed between the first and second enclosing structures 3*a*, 3*b*.

Each side wall portion 150, 152 is approximately extending one quarter of a circle, i.e. approximately 90°. This leaves a passage through the revolving door 100, formed between an entrance section 154 and an exit section 156. The entrance section 154 and the exit section 156 extend on opposite sides between the first and second side wall portions 150, 152.

Figure 2C:
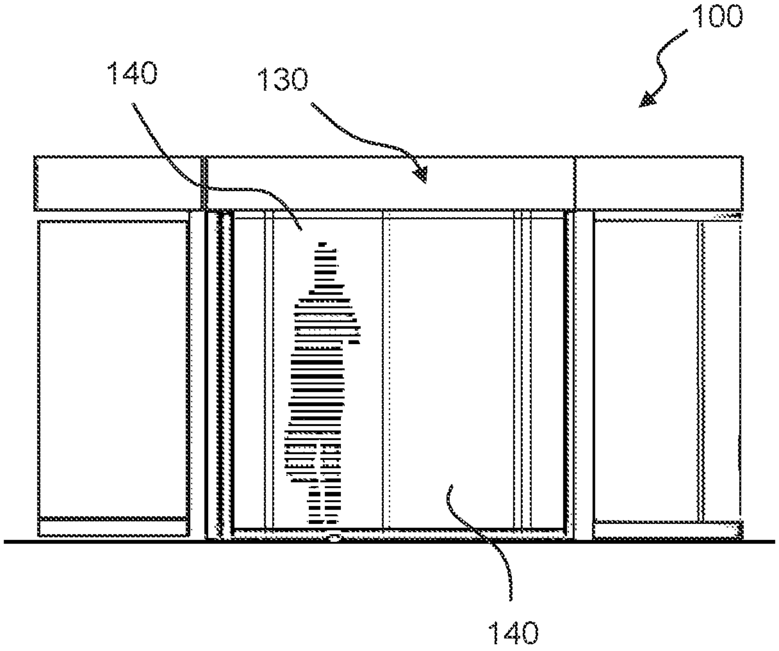
FIG. 2*c* show different views of a revolving door according to a further embodiment.
Figure 2C:
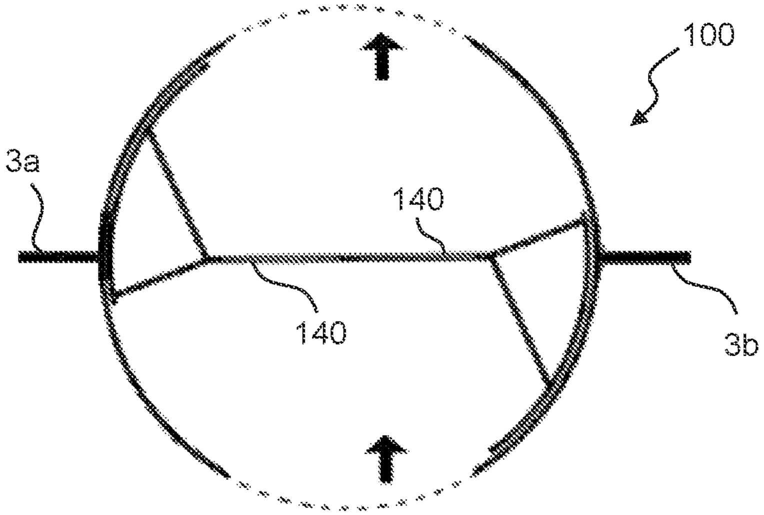

Another example of a revolving door 100 is shown in FIG. 2*c*. For this embodiment there is no central column but the rotating assembly 130 is formed by a wheel assembly accommodated above the ceiling of the revolving door 100. The door panels 140 are connected to the wheel assembly at their respective upper portion.

During operation, the revolving door 100 is allowing a person to walk through the door 100 by rotation of the door panels 140. For this, a drive unit 160 may be provided, or rotation of the door panels 140 may be accomplished simply by the passing person pushing the door panel 140 in front of her.

As explained in the background section, normal installation of a revolving door of the types described with reference to FIGS. 1-2 is performed by providing the revolving door in a non-assembled state, whereby building the revolving door is performed at the final location. The inventors have realized that improved performance and robustness of the revolving door can be achieved if the revolving door 100 is manufactured in a dedicated factory, whereby means are provided for simplifying a secure transport. This is especially important for temporary installations where there is often a lack of technically qualified staff, unable to do correct assembly of revolving doors 100, and unaware of how to ensure safe transport of finished revolving doors 100 being produced remote from the event site.

Figure 3A:
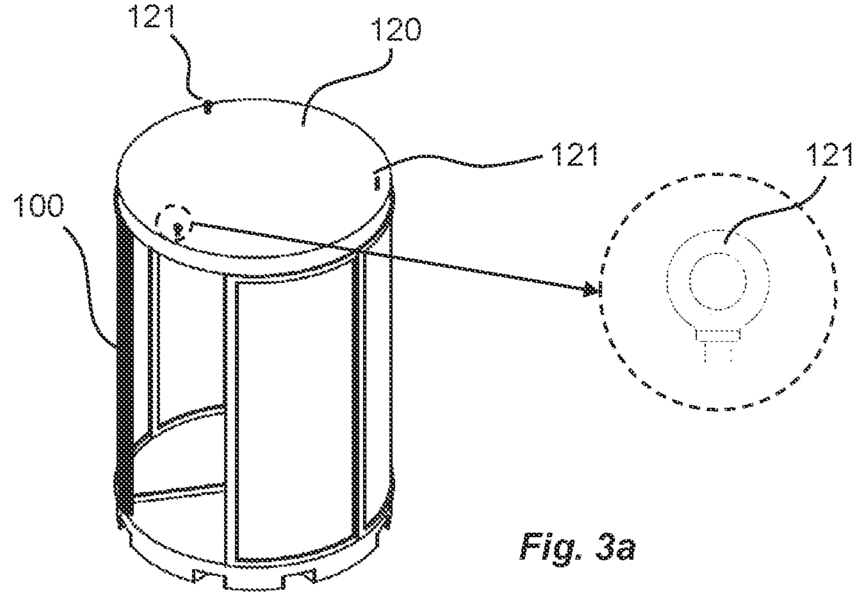
FIG. 3*a* is an isometric view of a revolving door according to an embodiment.

An embodiment of a revolving door 100 solving this critical issue is schematically shown in FIG. 3*a*. In order to allow secure transport of a ready-to-use revolving door 100, the upper portion 120 is provided with one or more lifting means 121 projecting upwards from the upper portion 120. In this example, the lifting means are provided as three eye bolts 121. The eye bolts 121, of which one is shown in more details in the enlarged section of FIG. 3*a*, are arranged close to the periphery of the upper portion 120 and equally spaced apart; for a total number of three eye bolts 121, the angular distance between two adjacent eye bolts is 120°. While three eye bolts 121 provide a stabilization of the revolving door 100 in the horizontal plane, it should be realized that any number of lifting means can be utilized as long as they allow the revolving door 100 to be lifted. Thus, the eye bolts 121 may be equally spaced apart relative each other. Accordingly, the eye bolts 121 may be evenly distributed along the periphery of the upper portion 120.

Figure 3B:
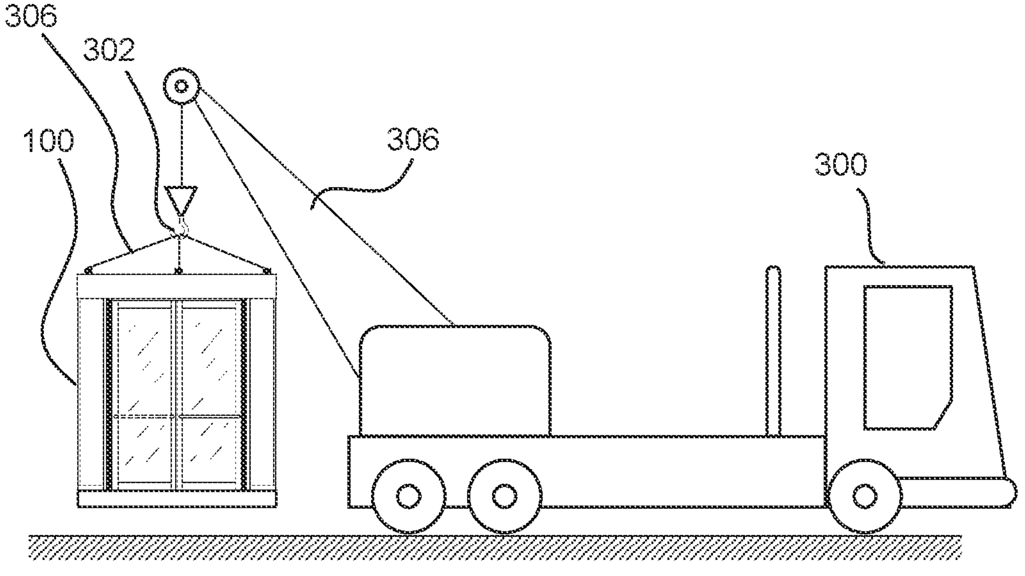
FIG. 3*b* is a side view of a process for moving the revolving door shown in FIG. 3*a;*

Transporting of the revolving door 100 is schematically shown in FIG. 3*b*. A crane truck 300, or any suitable vehicle, is provided with a lifting hook 302. By connecting a chain 304 or similar member to the lifting means 121 of the revolving door 100, the lifting hook 302 can engage with the chain 304 and by operating the crane 306 of the truck 300, the revolving door 100 is easily positioned at the desired position.

The eye bolts 121 may be fixedly mounted to the upper portion 120, or they me releasable attached such that they can be removed once the revolving door 100 is in place. However, the lifting means 121 may not necessarily be provided as eye bolts, but can be formed as a part of the upper portion 120; e.g. the upper portion 120 may be provided with separate grooves or similar that can be used to connect a chain or similar such that the revolving door 100 can be carried by the crane 304.

For the above-mentioned examples, the upper portion 120 is constructed such that it can carry the weight of the entire revolving door 100.

Figure 4A:
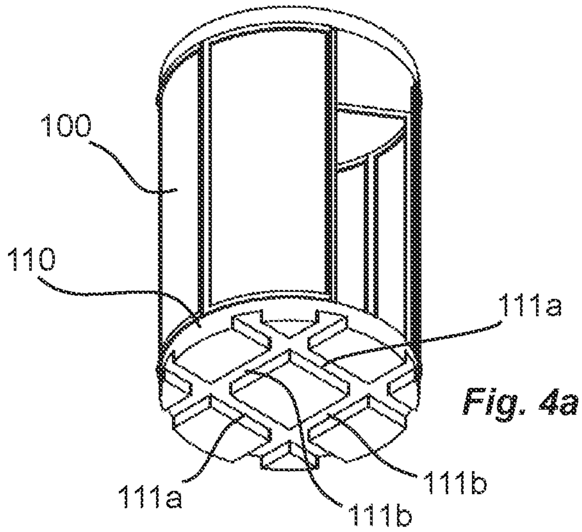
FIG. 4*a* is an isometric view of a revolving door according to an embodiment.

Another embodiment of a revolving door 100 is shown in FIG. 4*a*. Shown partly from the underside, the base portion 110 of the revolving door 100 is provided with a number of grooves 111. The grooves 111 are arranged in pairs; a first pair of grooves 111*a* are arranged perpendicular to a second pair of grooves 111*b*. The grooves of a common pair 111*a*, 111*b* are arranged in parallel and spaced apart at a distance corresponding to a standard distance between the forks of a lift truck. The depth of each groove 111*a-b* is set so that a fork can be inserted into the groove 111*a-b*.

The grooves 111*a-b* extend from one side of the base portion 110 to the other side of the base portion 110, such that a fork lift can access the grooves 111*a-b* from any side. Having the two sets of grooves 111*a-b*, there a four different ways for a fork lift to engage with the revolving door 100.

Figure 4B:
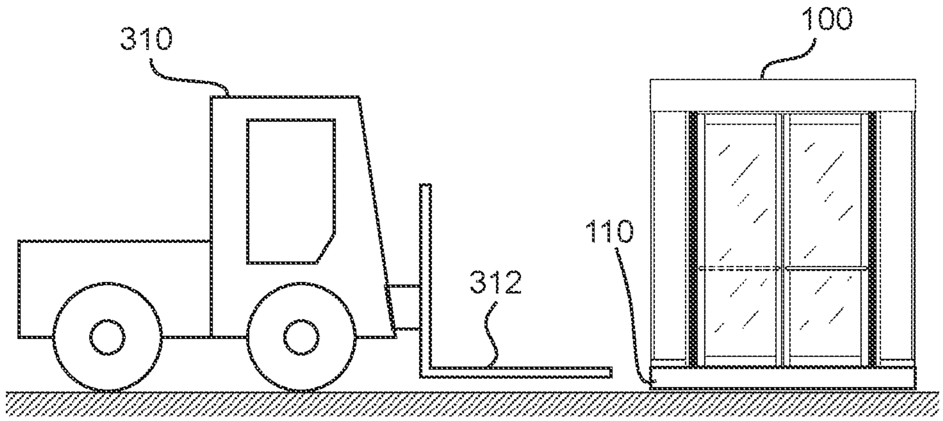
FIGS. 4*b-c* is a side view of a process for moving the revolving door shown in FIG. 4*a;*
Figure 4C:
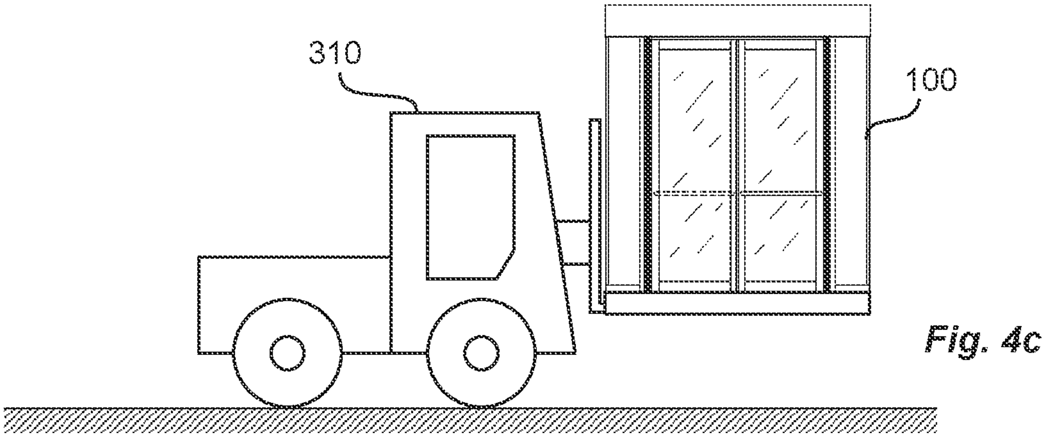

In FIGS. 4*b-c* a moving sequence is shown. A fork lift 310 is approaching the revolving door 100, as shown in FIG. 4*b*. The fork 312, forming a lifting member, is in a lowered position, meaning that the fork 312 can be inserted into a pair of grooves 111*a-b* of the base portion 110 of the revolving door 100. Once the fork 312 is in place under the revolving door 100, the fork 312 is lifted thereby also lifting the revolving door 100. The revolving door 100 can thereafter be moved to its desired position, at which the fork 312 is lowered and withdrawn from the base portion 110.

A revolving door 100 may be provided with lifting means at the upper portion 120, as described with reference to FIGS. 3*a-b*, at the base portion 110, as described with reference to FIGS. 4*a-c*, or both. Hence, for the embodiment shown in FIG. 4*a* the lifting means equal the grooves 111*a-b*.

As mentioned earlier, the revolving door 100 may be either fully manual, i.e. a person is pushing the door panels 140 to rotate, or the revolving door 100 may at least partly automatic meaning that a drive unit is provided for assisting a person walking through the revolving door 100.

Figure 5:
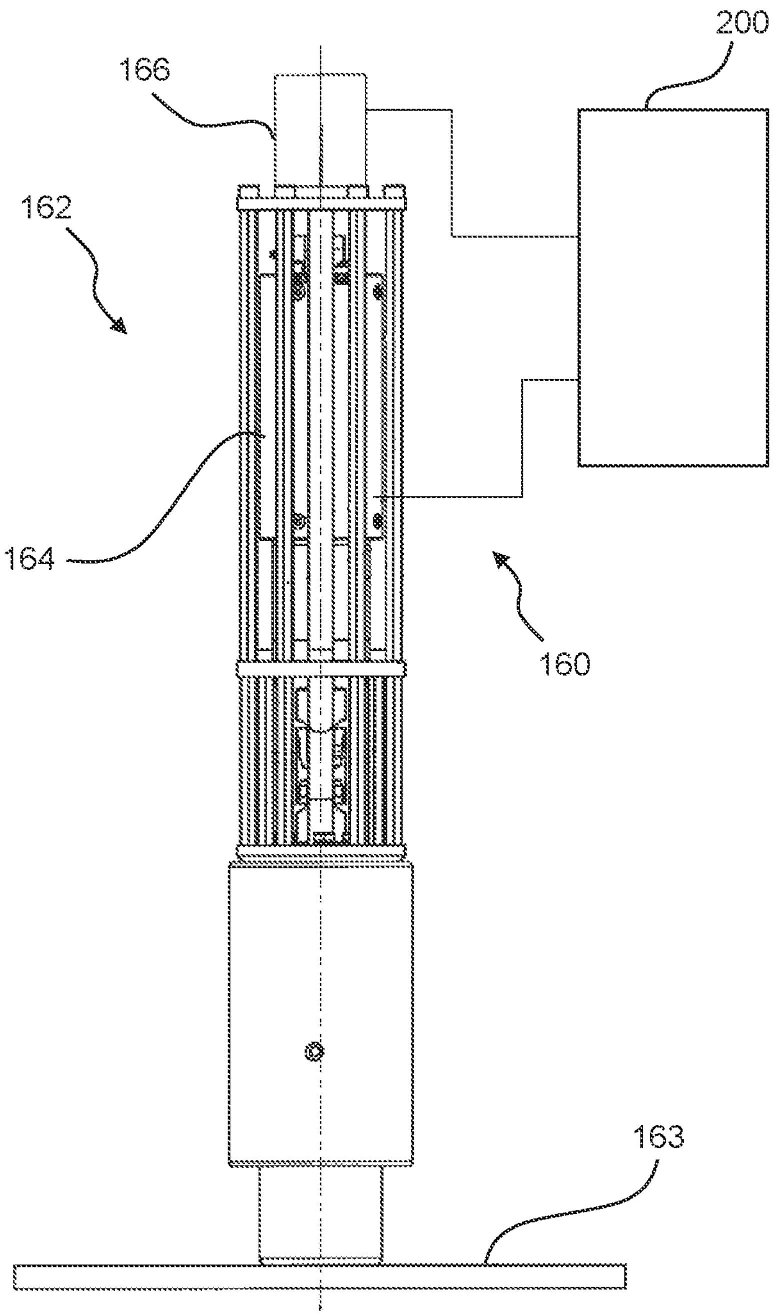
FIG. 5 is a side view of a drive unit of a revolving door according to an embodiment.

For embodiments where the revolving door 100 is motor operated, an example of a drive unit 160 is shown in FIG. 5. The drive unit 160 can be provided as part of a driving base unit 162, which in turn forms part of the central column 130. The driving base unit 162 is resting on a column support 163 and is arranged to drive the central column 130 to rotate thereby causing the door panels 140, being connected to the central column 130, also to rotate around said central axis A1. In case of a revolving door 100 as shown in FIG. 2*c*, the drive unit 160 may be arranged above the ceiling to operate directly on the rotating assembly 130 in order to drive the door panels 140.

The drive unit 160 comprises an electrical motor 164 and a control unit 166. The electrical motor 164 is arranged to rotate the door panels 140 upon receiving control signals from the control unit 166. The control unit 166 is in turn configured to receive various inputs, such as sensor signals etc., in order to control operation of the revolving door 100.

The revolving door 100 can optionally be powered by a stand-alone power system 200, which is connected to the drive unit 160. As shown in FIG. 5, the stand-alone power system 200 is connected to the control unit 166, as well as to the drive motor 164.

Figure 6:
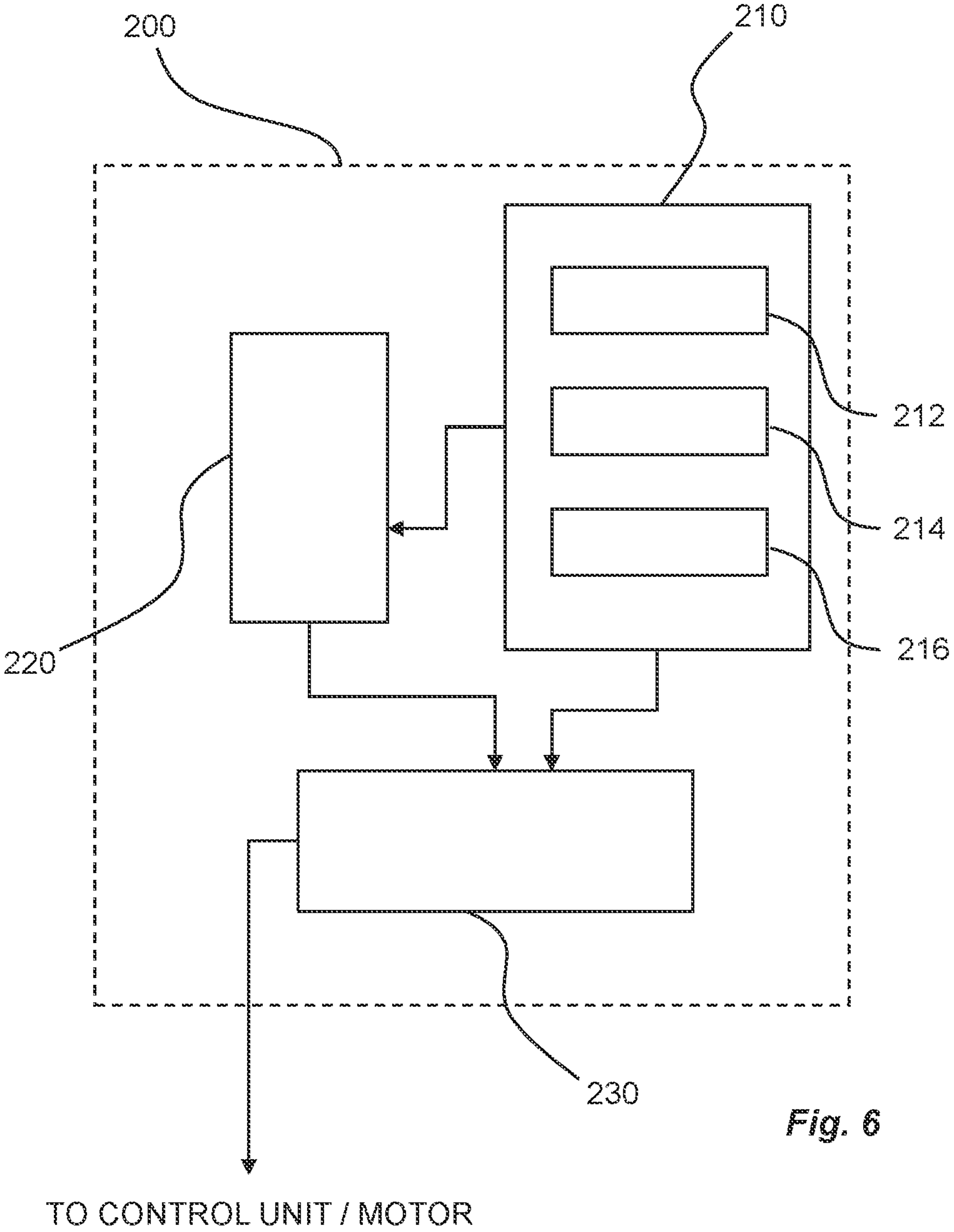
FIG. 6 is a schematic view of a stand-alone power system of a revolving door according to an embodiment.

The stand-alone power system 200, which is further shown in FIG. 6, is an electricity system which is capable of generating electricity, storing electricity, and regulate the generated electrical power. The stand-alone power system 200 thereby allows the revolving door 100 to be positioned at off-grid locations, or at other areas where the available power is not sufficient for operating revolving doors 100 in order to control access for people entering and/or exiting the event area. For example, for an event site 1 there may be a certain amount of available power which is required to power light equipment, sound equipment, medical equipment, etc. Should the event manager decide to further improve the event site 1 by also including access control, i.e. by means of revolving doors 100 as described with reference to FIG. 1, the total amount of available power may not be sufficient to fully power all these revolving doors 100. For this, the stand-alone power system 200 provides the required add-on power for the associated revolving door 100 such that accurate operation of the door 100 is ensured.

As is shown in FIG. 6 the stand-alone power system 200 comprises an electricity generation apparatus 210, an energy storing device 220, and a power regulation apparatus 230. The electricity generation apparatus 210 may include one or more of a wind turbine 212, a solar cell 214, and a diesel generator 216.

The energy storing device 220 is preferably a battery. While the drive unit 160 requires power in the range of 600 W, it would be preferred to allow the battery to store enough energy to power the revolving door 100 for at least a few hours of operation, such as 1,2-2,4 kWh. The battery will thereby allow for autonomous operation of the revolving door 100 by compensating for the difference between current power production of the electricity generation apparatus 210 and power consumption during use of the revolving door 100.

The energy regulation apparatus 230 comprises power management electronics to provide the motor 164 and the control unit 166 of the drive unit 160 with sufficient power. The energy regulation apparatus thereby regulates power production from the electricity generation apparatus 210, controls power use by classifying the actual load of the revolving door 100, and preferably also protects the energy storing device 220.

It should be mentioned that the revolving door 100 may be further equipped with an emergency battery (not shown) being capable to operate the door 100 during a situation when the main power supply is disconnected or unable to provide any power to the drive unit 160. Such emergency battery is normally of much less capacity than the energy storing device 220 of the stand-alone power system 200 described herein. However, in some embodiments it may be possible to utilize such already existing emergency battery as the energy storing device 220 of the stand-alone power system 200.

Returning to the example mentioned above of a revolving door 100 having a drive unit 160 operating at 600 W, the electricity generation apparatus 210 should preferably be capable of generating no less than that amount. Some examples of revolving doors 100 will be given in the following. Although the lifting means 111*a-b*, 121 are not shown in the following figures, it should be noted that every revolving door 100 described in the following is actually provided with some kind of lifting means for facilitating transport of the ready-to-use revolving door 100. The lifting means may e.g. be a plurality of eye bolts 121 arranged at the upper portion 120 of the revolving door 100 or a pair of grooves 111*a-b* arranged at the base portion 110 of the revolving door 100.

Figure 7A:
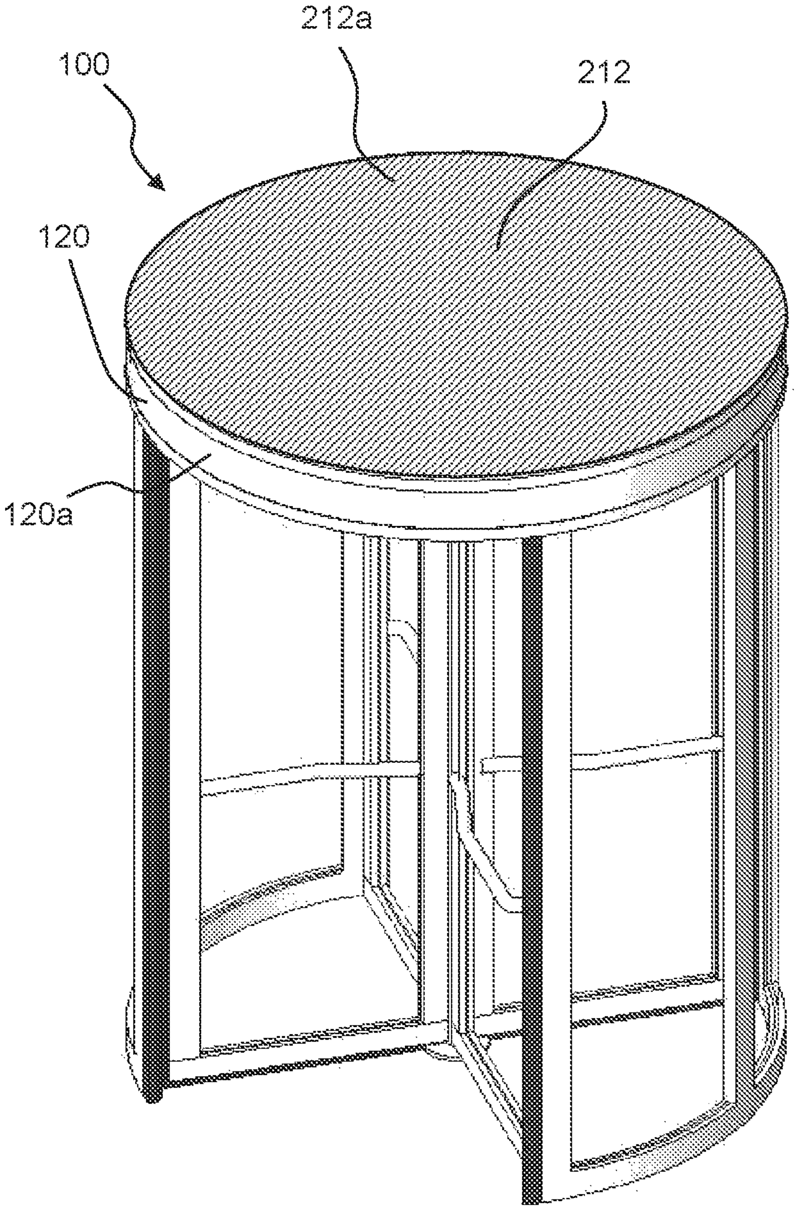
FIG. 7*a* is an isometric view of a revolving door according to an embodiment.

In FIG. 7*a*, an example of a revolving door 100 is shown. The revolving door 100 is similar to the door 100 shown in FIGS. 2*a-b*, and could thus be used for an event site 1 as described with reference to FIG. 1. The revolving door 100 is provided with a stand-alone power system 200 as described earlier. Especially, the upper top portion 120 is covered by a solar panel 212*a* containing solar cells 212, thereby forming the electricity generation apparatus 210 of the stand-alone power system 200. The remaining parts of the stand-alone power system 200, i.e. the battery 220 and the electricity regulation apparatus 230 as well as a possible inverter (not shown), are preferably hidden inside the rotating assembly, e.g. the central column 130, or inside a cavity of the upper portion 120. As light is incident on the roof of the revolving door 100, i.e. on the solar cells 212, electricity will be generated. If energy production is higher than the current use, excess energy will be stored in the battery 220 for later use. On the other hand, if the energy production is less than the current use, the missing power will be supplied from the battery 220.

Although the solar panel 212*a* is arranged in a horizontal direction, it should be noted that in some embodiments the solar panel 212*a* may be somewhat tilted in order to improve the efficiency of the solar cells 212. Also, it may be possible to also cover the vertical sidewall 120*a* of the upper portion 120 with solar cells in order to further increase the power output of the stand-alone power system 200.

For example, the total area of the solar panel 212*a* may be 3-5 $m^2$, which would easily provide the required power of 600 W using standard solar panels.

In case the upper portion 120 is also provided with eye bolts 121, the solar panel 212*a* may be provided with corresponding cutouts for allowing the eye bolts 121 to connect to an underlying load-bearing structure of the upper portion 120.

Figure 7B:
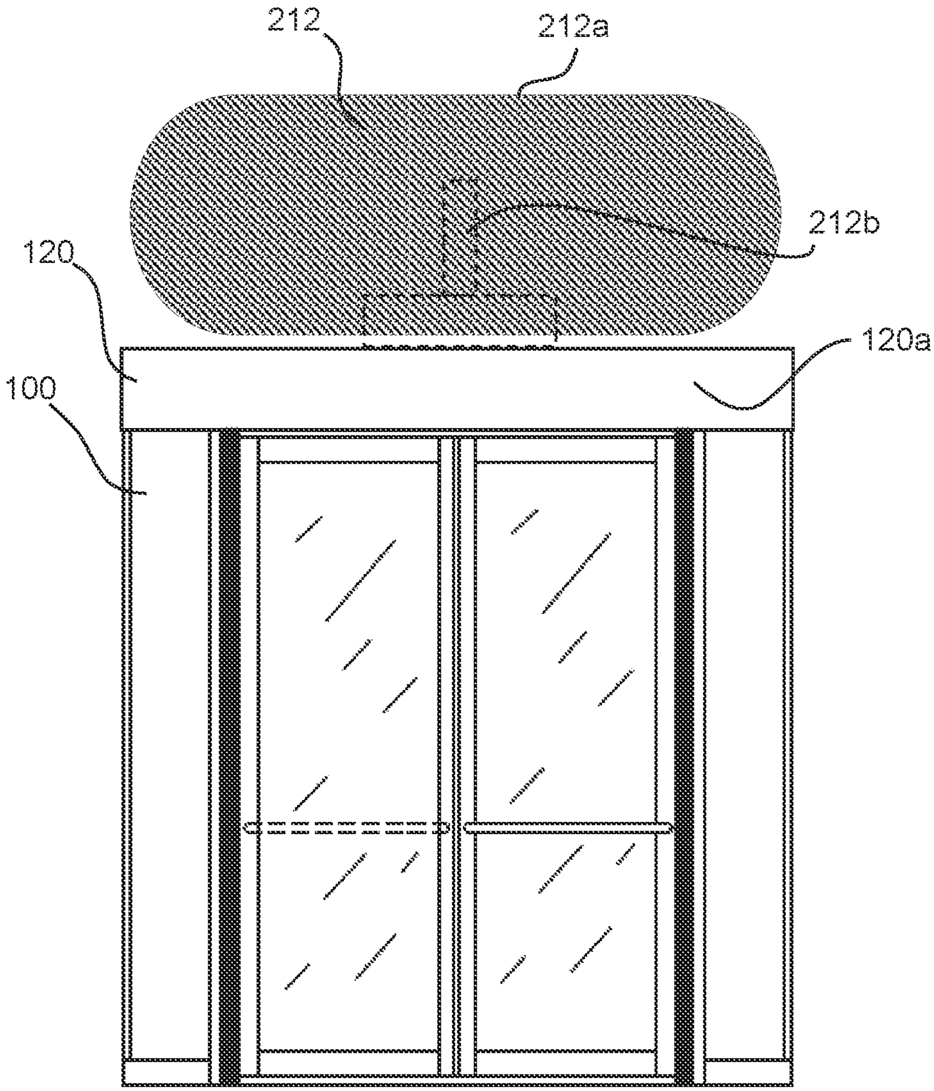
FIG. 7*b* is a front view of a revolving door according to an embodiment.

Another embodiment of a revolving door 100 is shown in FIG. 7*b*. Also for this revolving door 100 the stand-alone power system 200 is provided with a solar panel 212*a* comprising a plurality of photo-voltaic solar cells 212. The solar panel 212*a* is mounted at an upright position on the upper portion 120, preferably tilted backwards. The solar panel 212*a* is mounted on a support 212*b* being configured to rotate and/or tilt the solar panel 212*a*. The support 212*b* may for this purpose be connected to the control unit 166 and/or the electricity regulation apparatus 230 such that the solar panel 212*a* can track the current position of the sun during the day in order to produce maximum power. It should be realized that also for this embodiment the vertical sidewall 120*a* of the upper portion 120 can be provided with solar cells.

Figure 7C:
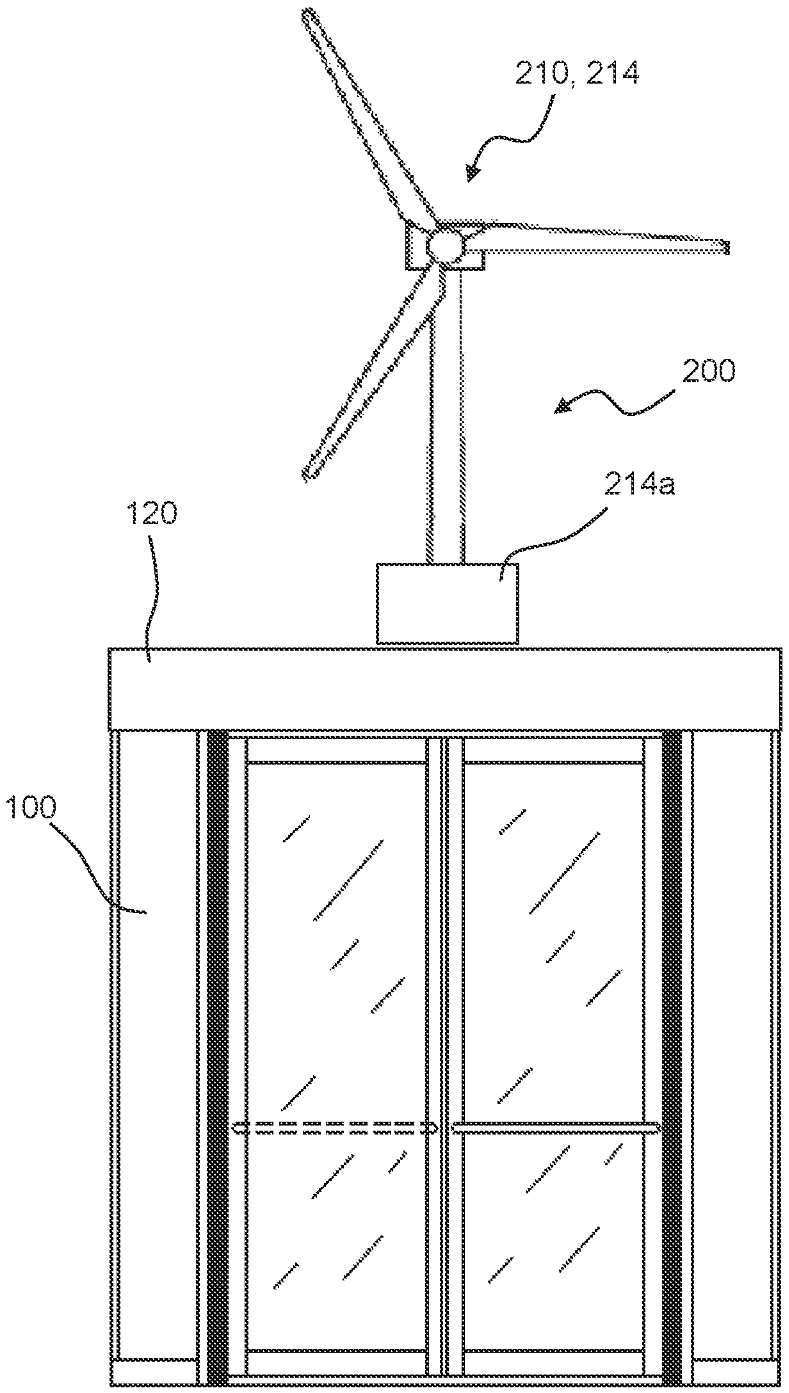
FIG. 7*c* is a front view of a revolving door according to an embodiment.

In FIG. 7*c* another embodiment of a revolving door 100 is shown. Similar to the previous examples, the electricity generation apparatus 210 is arranged onto the upper portion 120 of the revolving door 100. Instead of a solar panel, the electricity generation apparatus 210 is in this embodiment a wind turbine 214. The wind turbine 214 is arranged on a support 214*a* that is fixed onto the upper portion 120 of the revolving door 100, but preferably the support 214*a* allows the wind turbine 214 to rotate in order to face the wind. The wind turbine 214 will thereby provide maximum efficiency independently of the wind direction. Although the wind turbine 214 has a horizontal rotational axis, it is possible to use other types of wind turbines as the electricity generation apparatus 210 of the stand-alone power system 200 of the revolving door 100. Also for this embodiment, the remaining parts of the stand-alone power system 200, i.e. the battery 220 and the electricity regulation apparatus 230 as well as a possible inverter (not shown), are preferably hidden inside the rotating assembly, e.g. the central column 130, or inside a cavity of the upper portion 120.

Figure 7D:
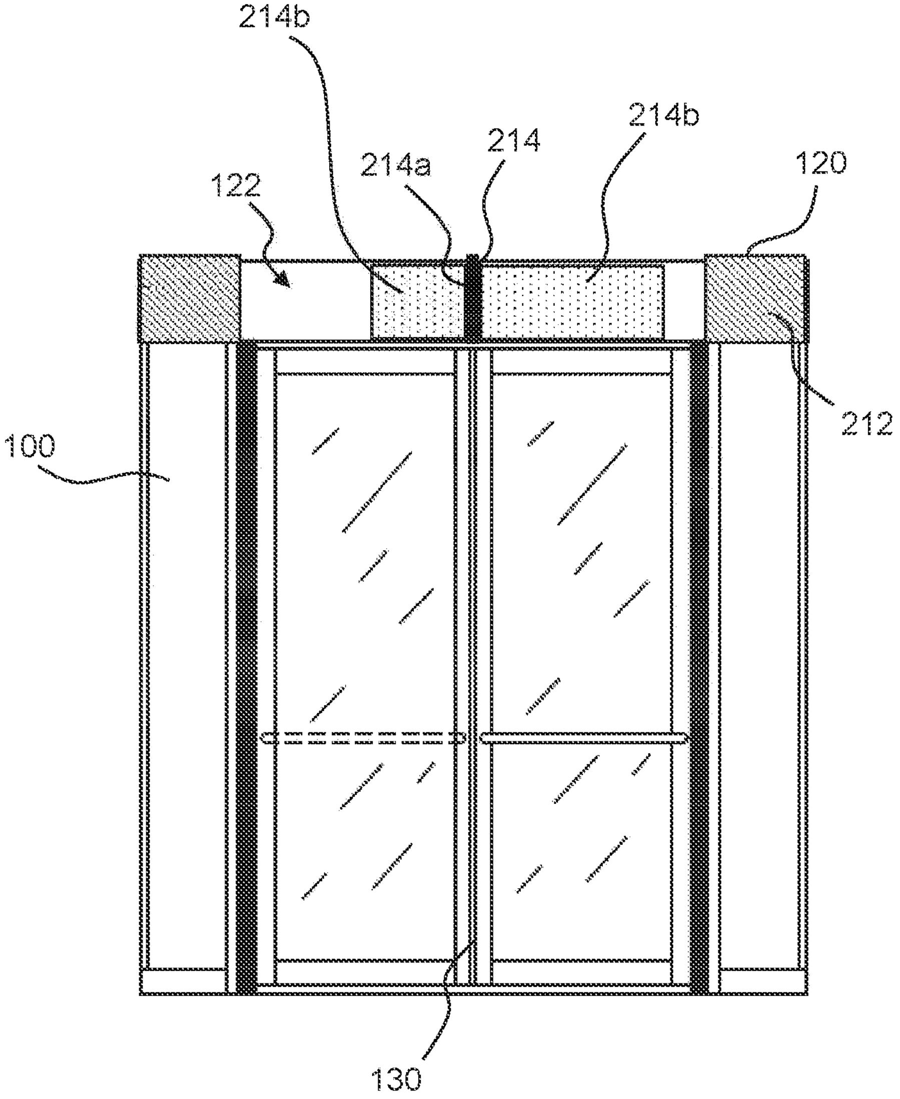
FIG. 7*d* is a front view of a revolving door according to an embodiment.

In a yet further embodiment, as shown in FIG. 7*d*, the wind turbine 214 is arranged inside the upper portion 120 of the revolving door 100. For this, the upper portion 120 is provided with one or more openings 122 extending at least along a part of the periphery of the upper portion 120. As can be seen in the example of FIG. 5*d*, the remaining sidewall 120*a* of the upper portion 120 is covered with a solar panel 212 having a plurality of solar cells, similar to what was described with reference to FIG. 5*a*. Hence, the stand-alone power system 200 shown in FIG. 5*d* is a so called hybrid power system comprising a wind turbine 214 as well as a solar panel 212.

The wind turbine 214 has a vertical rotational shaft 214*a* being concentric with the central column 130 of the revolving door 100. A plurality of vanes 214*b* are connected to the shaft 214*a* and forced to rotate when the wind is incident on the opening 122. Upon rotation of the vanes 214*b*, electricity is generated in accordance with well-known principles. Hence, the wind turbine 214 comprises additional components such as a generator, a gearbox, control electronics, etc. The remaining parts of the stand-alone power system 200, i.e. the battery 220 and the electricity regulation apparatus 230 as well as a possible inverter (not shown), are preferably hidden inside the rotating assembly, e.g. the central column 130, or inside a cavity of the upper portion 120.

Figure 7E:
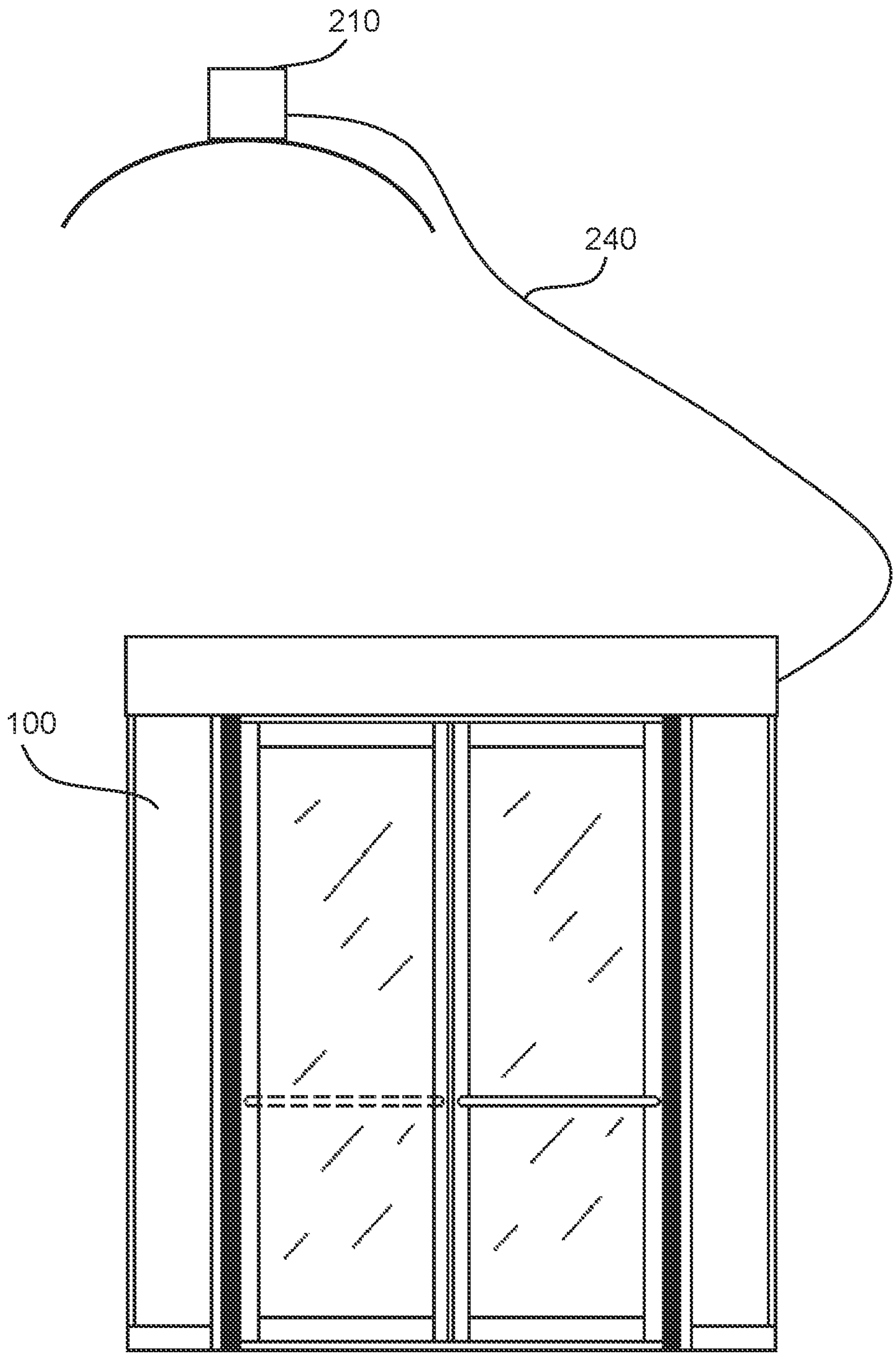
FIG. 7*e* is a front view of a revolving door according to an embodiment.

In FIG. 7*e* a yet further embodiment of a revolving door 100 is shown. In this embodiment the stand-alone power system 200 is arranged party integral with the revolving door 100, and partly remote from the revolving door 100. In particular, the electricity generation apparatus 210 of the stand-alone power system 200 is located at a distance from the actual position of the revolving door 100. While the actual position of the revolving door 100 may be hard to adjust due to certain requirements of the event site 1, it is advantageous to allow for some flexibility of the position of the electricity generation apparatus 210. For example, the battery 220 and the regulation apparatus 230 can be arranged within the revolving door 100 while the electricity generation apparatus 210 is connected to the remaining parts of the power system 200 by means of a cable 240, as shown in FIG. 5*e*. The electricity generation apparatus 210 may e.g. be a wind turbine, a solar panel, or a diesel generator. If the revolving door 100 is positioned in a shady area, it may be advantageous to arrange the solar panel at a position being more exposed to sun light. Similarly, if the revolving door 100 is arranged at a position where there is no or only very little wind, it may be advantageous to arrange the wind turbine at a remote hill. Yet further, if the revolving door 100 is arranged at a position where silence is desired, it may be advantageous to arrange the diesel generator at another location.

It should be noted that although the revolving doors 100 shown in FIG. 5*a-e* are based on a rotating assembly 130 in the form of a central column, the stand-alone power system could also be provided for revolving doors 100 of the type shown in FIG. 2*c*, i.e. where the rotating assembly 130 is arranged above the ceiling thereby causing the entire ceiling, and the door panels 140 attached thereto, to rotate.

In a yet further embodiment, the electricity generation apparatus 210 of the stand-alone power system 200 is configured to harvest energy from the revolving door 100 when being used. As the revolving door 100 is operated by rotating the rotating assembly 130 and the thereto connected door panels 140, the inventors have realized that it may be possible to generate electricity by such movement, especially during braking of the rotational movement. In one embodiment, the rotating assembly 130 is provided with an induction coupling such that electricity is generated upon rotation of the rotating assembly 130. This is beneficial as no braking is required to produce electrical power, but a constant generation of electricity is occurring when the revolving door 100 is in motion. In another embodiment, the revolving door 100 is equipped with a brake, such as a magnetic brake. The brake is configured to be activated in an emergency situation, e.g. when a person is too close to a door panel 140, and/or when a person is exiting the revolving door 100 and no further rotation of the door panels 140 is required. Such braking action can be used to generate electricity, and the produced power can be stored in the battery for later use.

It should further be mentioned that the above-described embodiments may be combined in any suitable configuration.

It is apparent to a person skilled in the art that the basic idea may be implemented in various ways. The invention and its embodiments are thus not limited to the examples described above; instead they may vary within the scope of the claims.

The invention claimed is:

1. A revolving door for temporarily closing a gap between first and second enclosing structures comprising base portion in the shape of a complete circle, an upper portion, and a rotating assembly extending between the base portion and the upper portion, and at least one door panel connected to the rotating assembly and being rotatably arranged around a central axis, a first sidewall portion on a first side of the rotating assembly arranged in connection with the first enclosing structure, and a second sidewall portion on a second side of the rotating assembly arranged in connection with the second enclosing structure, wherein the revolving door further comprises one or more lifting means for lifting the revolving door and placing the door between the first and second enclosing structures, wherein said lifting means are arranged at the base portion, and wherein the lifting means comprises a first pair of two parallel grooves, each groove extending as a chord from one side of the base portion directly to the opposite side of the base portion, wherein each groove is configured to receive a lifting member.

2. The revolving door according to claim 1, wherein the lifting one or more means further comprises a second pair of two parallel grooves, each groove extending as a chord from one side of the base portion directly to the opposite side of the base portion, wherein the second pair of grooves are arranged perpendicular to the first pair of grooves.

3. The revolving door according to claim 1, wherein said one or more lifting means are arranged at the upper portion.

4. The revolving door according to claim 3, wherein the one or more lifting means comprises at least one eye bolt.

5. The revolving door according to claim 3, wherein the one or more lifting means comprises a plurality of eye bolts.

6. The revolving door according to claim 5, wherein the plurality of eye bolts are arranged at the periphery of the upper portion.

7. The revolving door according to claim 5, wherein the plurality of eye bolts are equally spaced apart.

8. The revolving door according to claim 3, wherein the one or more lifting means extend vertically upwards from the upper portion.

9. The revolving door according to claim 1, further comprising a drive unit configured to control operation of the revolving door, and a stand-alone power system connected to the drive unit.

10. The revolving door according to claim 9, wherein the stand-alone power system comprises an electricity generation apparatus, an energy storing device, and a power regulation apparatus.

11. The revolving door according to claim 10, wherein the electricity generation apparatus comprises a solar cell, a wind turbine, and/or a diesel generator.

12. The revolving door according to claim 9, wherein the stand-alone power system is dimensioned to supply at least a part of the total power required by the drive unit.

13. The revolving door according to claim 12, wherein the stand-alone power system is dimensioned to supply the total power required by the drive unit.

* * * * *